(12) United States Patent
Marioni (10) Patent No.: US 7,045,922 B2
(45) Date of Patent: May 16, 2006

(54) PERMANENT-MAGNET SYNCHRONOUS ELECTRIC MOTOR WITH ISOLATED ROTOR FOR CIRCULATION PUMPS OF HEATING AND/OR CONDITIONING SYSTEMS

(75) Inventor: Elio Marioni, Dueville (IT)

(73) Assignee: Askoll Holding S.r.l., (IT)

( * ) Notice: Subject to any disclaimer, the term of this patent is extended or adjusted under 35 U.S.C. 154(b) by 89 days.

(21) Appl. No.: 10/754,248

(22) Filed: Jan. 9, 2004

(65) Prior Publication Data

US 2004/0160142 A1 Aug. 19, 2004

(30) Foreign Application Priority Data

Jan. 10, 2003 (EP) .................................. 03425008

(51) Int. Cl.
*H02K 5/128* (2006.01)

(52) U.S. Cl. .......................................... 310/91; 310/261

(58) Field of Classification Search ................ 310/261, 310/90, 91, 67 R, 58–63
See application file for complete search history.

(56) References Cited

U.S. PATENT DOCUMENTS

| 5,128,819 | A | * | 7/1992 | Elsaesser et al. | ........ 360/99.08 |
| 6,365,998 | B1 | * | 4/2002 | Kech et al. | ........ 310/194 |
| 6,452,303 | B1 | | 9/2002 | Marioni | |
| 6,798,096 | B1 | * | 9/2004 | Browne et al. | ................ 310/58 |
| 6,814,549 | B1 | * | 11/2004 | Kimberlin et al. | .......... 417/357 |
| 6,867,518 | B1 | * | 3/2005 | Kurosawa | ..................... 310/89 |

FOREIGN PATENT DOCUMENTS

| CH | 335291 A1 | | 12/1958 |
| DE | 39 31 988 A1 | | 4/1991 |
| DE | 3931988 | * | 4/1991 |
| FR | 1 281 446 A1 | | 1/1962 |
| FR | 2 398 435 A1 | | 2/1979 |
| IT | EP 1437817 | * | 1/2003 |
| IT | EP 1437819 | * | 1/2003 |
| IT | EP 1450467 | * | 2/2003 |
| WO | WO 01/84690 A2 | | 11/2001 |

* cited by examiner

Primary Examiner—Tran Nguyen
(74) Attorney, Agent, or Firm—Akerman Senterfitt (57) ABSTRACT

A permanent-magnet synchronous electric motor with isolated rotor for circulation pumps of heating and/or conditioning systems having: a motor casing; a stator in the motor casing and having associated coils; a housing tightly isolated from the stator for hosting a permanent-magnet rotor; a shaft integral with the rotor; and a bearing supporting the shaft in the housing. The bearing has a bush rotatively engaged by one end of the shaft, a sleeve inserted at one end of the housing and keyed onto the bush, and a cap having a first portion removably inserted into the sleeve and a second portion screwly engaged in a threaded seat of the casing. This design has the major advantage of combining in a unitary part, the sleeve, the supporting function of the bearing and the hydraulic tightness with respect to the electronic components mounted at the bottom of the casing.

20 Claims, 12 Drawing Sheets

PERMANENT-MAGNET SYNCHRONOUS ELECTRIC MOTOR WITH ISOLATED ROTOR FOR CIRCULATION PUMPS OF HEATING AND/OR CONDITIONING SYSTEMS

FIELD OF THE INVENTION

The present invention relates to a permanent-magnet synchronous electric motor with isolated rotor for circulation pumps of heating systems.

The invention relates, in particular but not exclusively, to a permanent-magnet synchronous electric motor with isolated rotor for circulation pumps of heating and/or conditioning systems and comprising a motor casing, a stator in said motor casing with associated coils, a housing tightly isolated from the stator for hosting a permanent-magnet rotor, a shaft integral with the rotor, and bearing means supporting said shaft in said housing. The ensuing description will cover this specific field of application just for convenience of illustration.

BACKGROUND OF THE INVENTION

As the skilled ones in the art well know, the fluid circulation pumps assembled in heating systems or plants are commonly referred to as "circulators".

Current circulators are almost completely supplied with asynchronous motors. Circulators realized with a synchronous motor with a permanent-magnet rotor have become commercially successful only recently.

The most popular and cost-efficient synchronous motors comprise only two stator pole shoes, but, in an effort to overcome vibration problems, fourpole shoes synchronous motors have been used in recent circulators.

For example, a fourpole shoes stator for a synchronous motor of a circulator is disclosed in U.S. Pat. No. 6,452,303 to the same Applicant.

It is also known that the structural scheme of permanent-magnet rotor circulators includes, additionally to a stator having electromagnet with core of laminations and associated coils, also a rotor centrally located among the stator pole shoes.

A shaft extends axially through the rotor and is rotatively supported by bearingmeans, one of its ends being coupled to the operating member of the circulator, specifically a pump impeller.

Furthermore, the rotor is mounted within a tightly sealed housing, e.g. inside a steel tube, which is isolated from the stator, and the motor shaft is rotatively supported by bearings, respectively provided at the tube bottom and near the impeller.

A circulator structure of the above type is disclosed, for instance, in U.S. Pat. No. 6,365,998. The circulator of that patent is quite expensive, yet not entirely free of locking problems due to lime-scale or to impurities contained in the working fluid and revealing especially after long idle periods.

In fact, when the circulator is idle for a long period, usuallyin the summertime, its rotor can be locked at the starting step, this because of lime-scale stocked within the thin gap between the rotor and the retaining tube. The problem may affect the bearings supporting the motor shaft as well.

To set the circulator back to work, it has been common practice to apply a screwdriver slot realized on the motor shaft end opposite to the impeller. By using a screwdriver in this slot it is possible to apply a twisting couple able to unlock the rotor and restore the circulator functioning. Normally, anyway, the circulator rear part, where the shaft end provided with the slot can be reached, is protected by a box-like cover in which the electric and/or electronic driving circuits and components of the motor are arranged.

The protective cover must therefore allow the unlocking slot to be reached, yet keeping the hydraulic seal with respect to the electric parts.

The problem is more serious where the tube housing the rotor is made of a synthetic-plastic material and the rotor bearings must be attached to that tube.

Close rotor-to-tube assembly tolerances require precise alignment of the rotor bearings to prevent vibration problems shortening the circulator operating life.

A possible approach to the problem would be mounting the bearings on elastic, pliant blocks that allow the rotor to be easily self-aligned without compromising its functioning. This is an expensive solution, however, and it involves fairly precise motor assembling procedures.

The aim of the present invention is that of providing a permanent-magnet type of synchronous electric motor, particularly for circulation pumps of heating systems, which motor having appropriate constructional and functional features to allow, in a very simple overall embodiment, one of the rotor bearings to perform the dual function of allowing the rotor self-aligning even under severe operating conditions and allowing the slot in the end of the motor shaft easy to reach in the event of a lock of the pump.

SUMMARY OF THE INVENTION

A embodiment of this invention is directed to a permanent-magnet synchronous electric motor with isolated rotor for circulation pumps of heating and/or conditioning systems, comprising:
 a motor casing;
 a stator in said motor casing and having associated coils;
 a housing tightly isolated from the stator for hosting a permanent-magnet rotor;
 a shaft integral with the rotor;
 bearing means supporting said shaft in said housing and comprising:
 a bush rotatively engaged by one end of the shaft;
 a sleeve inserted at one end of the housing and keyed onto said bush; and
 a cap having a first portion removably inserted into said sleeve and a second portion screwly engaged in a threaded seat of the casing.

This solution has the major advantage of combining in a unitary part, the sleeve, the supporting function of the bearing means and the hydraulic tightness with respect to the electronic components mounted at the bottom of the casing.

The features and advantages of the motor of this invention should become apparent from the following description of an embodiment thereof, given by way of significant but non-limitative example with reference to the accompanying drawings.

DETAILED DESCRIPTION

With reference to the drawings, a permanent-magnet synchronous electric motor is shown generally with 1 in a schematic form, which motor being structured for centrifugal pumps 2, in particular with circulation pumps of heating and/or conditioning plants or systems.

As the skilled ones in the art well know, the motor 1 is structured to activate the operating member, i.e. an impeller 9 of the pump 2.

The motor 1 is enclosed within a protective casing 3 and has a stator 4 with associated core of laminations and statoric coils.

The stator 4 conventionally comprises a plurality of metal laminations 11, and statoric coils arranged in a cross configuration to form four pole shoes.

In a preferred embodiment, the stator 4 comprises a monolithic body 30 of thermoplastic material, which body has a central portion 31 in the shape of a parallelepipedic hollow with four arms or branches 32 that extend cross-like from the central body 31, each arm projecting from a respective wall of the parallelepipedic form.

The arms 32 also are hollow parallelepipedal bodies, and have respective free ends formed with a flange 33, the side dimension of each flange 33 being equal to the width of said central portion 31. Advantageously, each arm 32 serves as a spool to receive respective statoric coil thereon.

Figure 1:
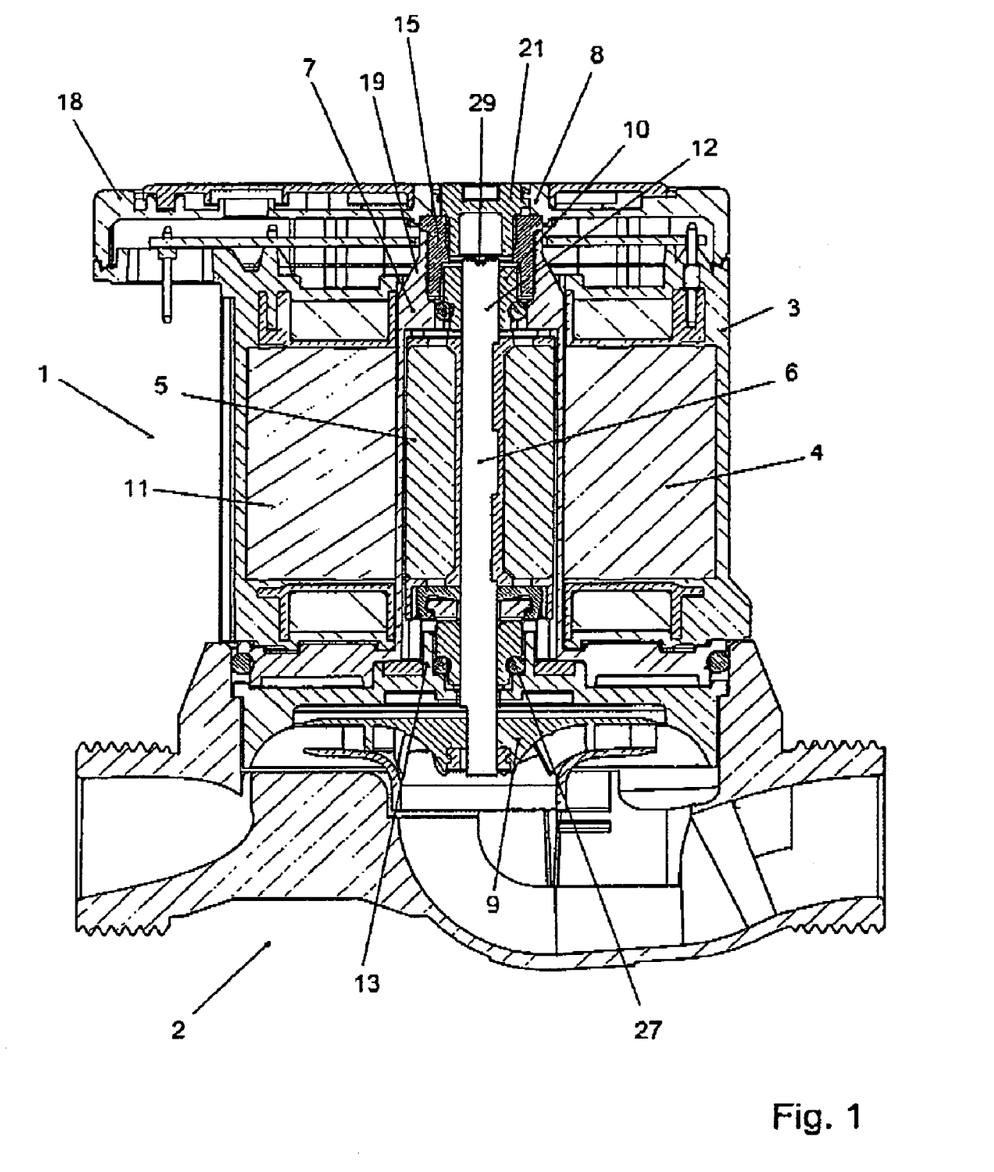
FIG. 1 is a longitudinal section view showing schematically a circulator equipped with a motor according to this invention.
Figure 2:
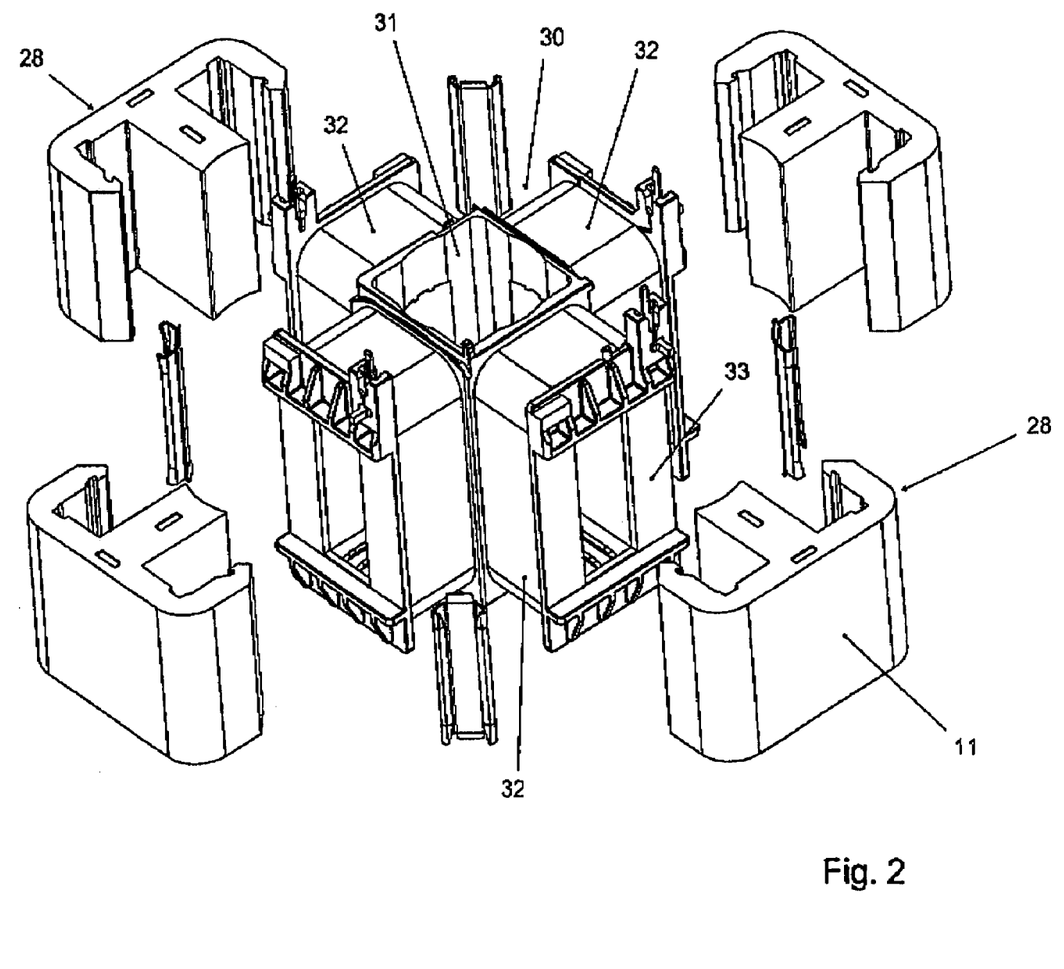
FIG. 2 is an exploded view showing schematically a statoric group inside the motor of FIG. 1.
Figure 3:
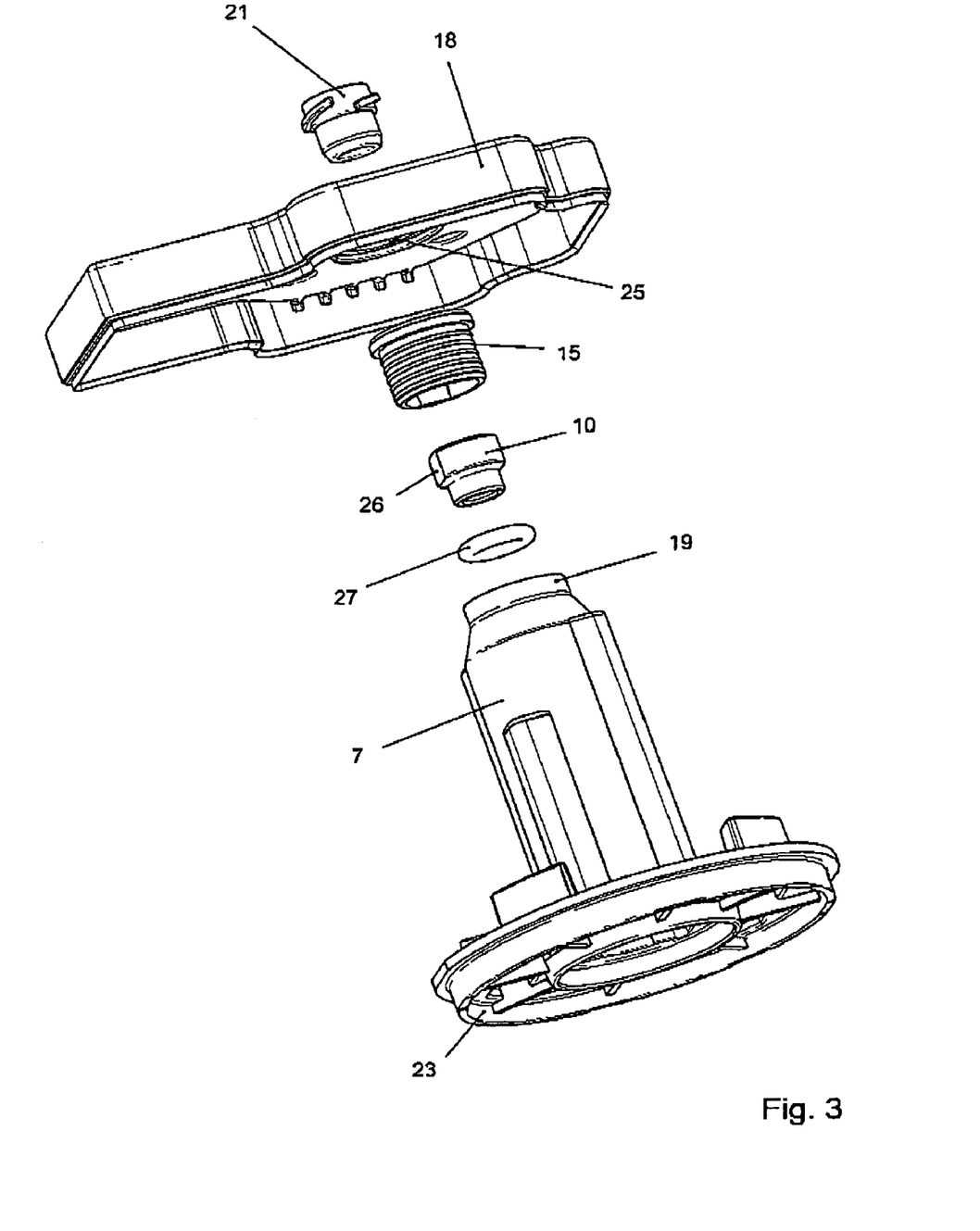
FIG. 3 is a perspective exploded view showing schematically some details of the inventive motor.

The metal laminations 11 are substantially E-shaped and packed together into four groups 28 of pole shoes which are associated to the coils by inserting the E-shape central portion inside the cavity of each arm 32, as clearly illustrated by the exploded view of FIG. 2.

The motor 1 further comprises a permanent-magnet rotor 5 mounted inside a housing 7 tightly isolated from the stator 4.

More particularly, the rotor 5 is mounted inside an essentially cylindrical tube 17 that is tapered at an open end 19.

The tube 17 is inserted through the central hollow portion 31 supporting the stator 4 coils, and is integral with a flange portion 23 overlying the stator 4 in a shape matching. A shaft 6 of the motor 1 is integral with the rotor 5 and kinematikally coupled with the impeller 9 of the pump 2, in a conventional way.

The shaft 6 is carried within the tube 17 by bearing means 8 provided at opposite ends. The bearing means 8 comprise a first bush 10 rotatively engaged by an end 12 of the shaft 6 next to the tapered end 19 of the tube 17.

A second bush 13 is mounted at the connection of the tube 17 and the flange portion 23, and is rotatively engaged by an ending section of the shaft 6 before coupling to the impeller 9.

Respective ring seals 27 are mounted between each bush 10, 13 and the housing 7. The bushes 10, 13 may be of graphite or thermoplastic or ceramic material.

Advantageously in this invention, a sleeve piece 15 is keyed onto the first bush 10 and fixedly inserted in the tapered end 19 of the tube 17.

The sleeve 15 is made of elastomer or thermoplastic material and adapted to withstand high working fluid temperatures of even more than 110° C.

Figure 4:
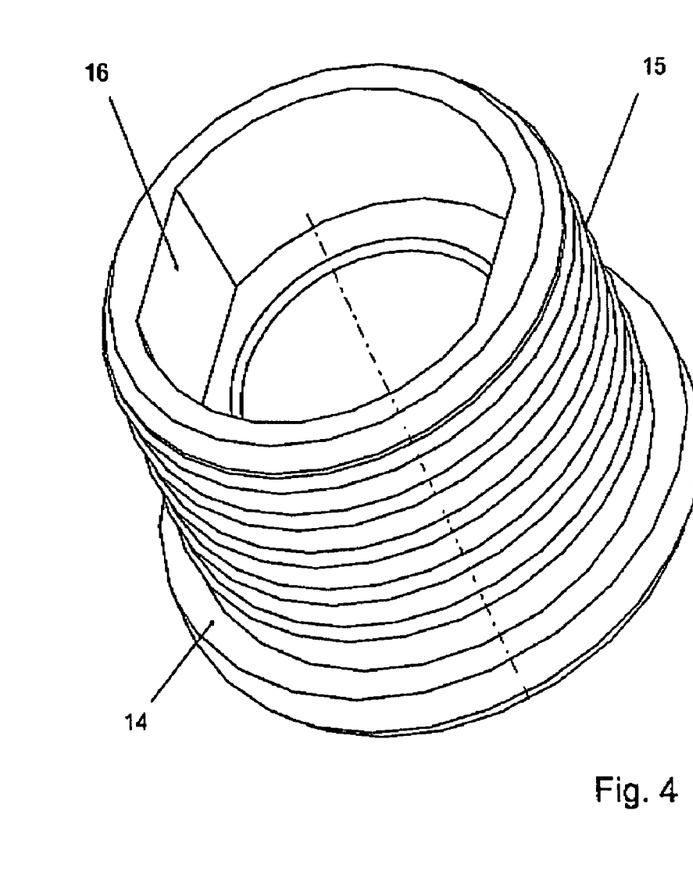
FIG. 4 is a perspective view of a specific component of the inventive motor.
Figure 5:
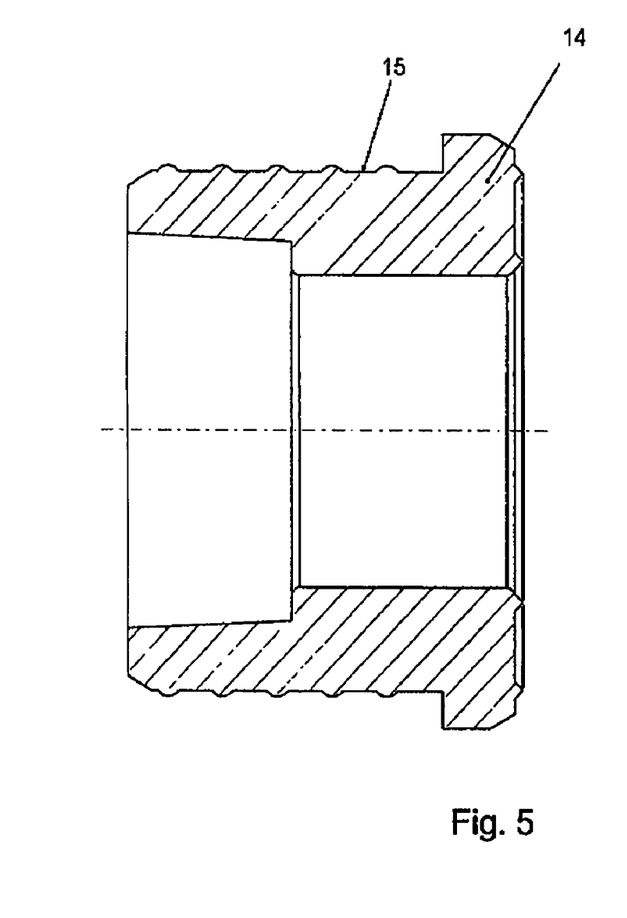
FIG. 5 is a longitudinal section view of the component shown in FIG. 4.
Figure 6:
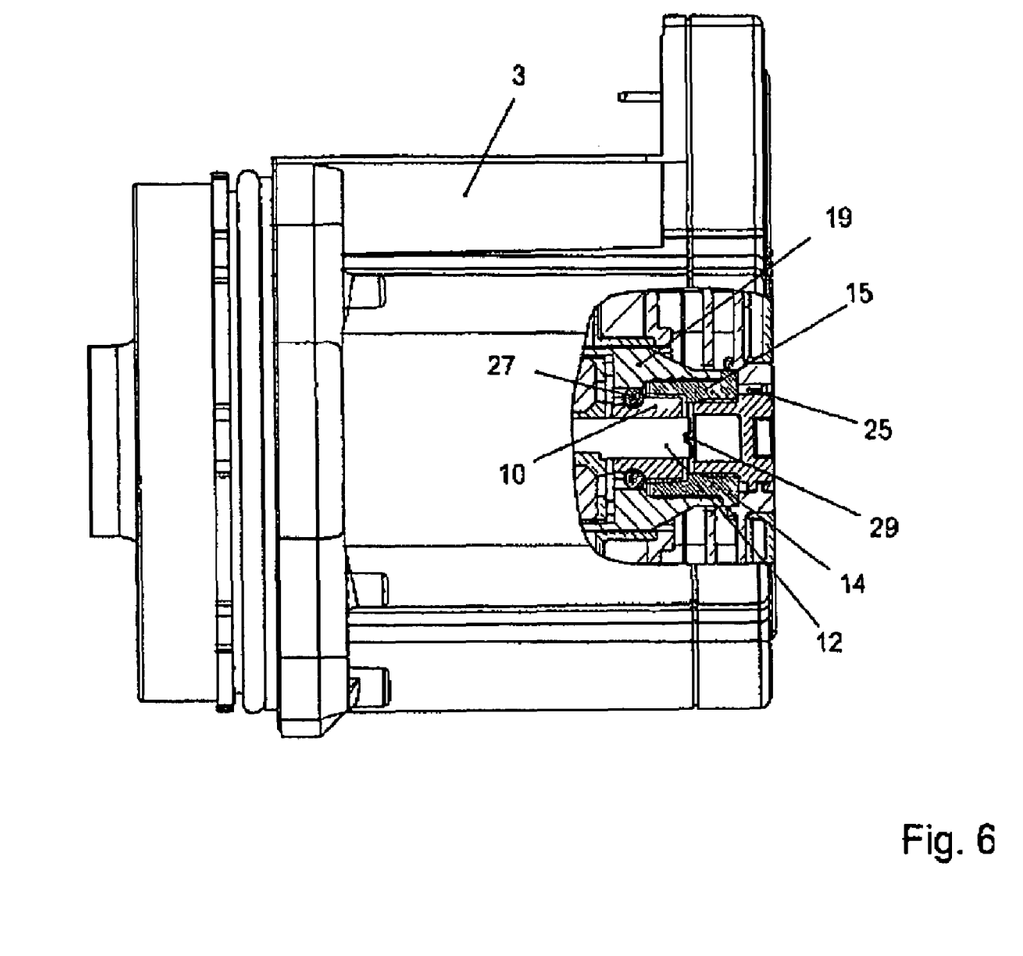
FIG. 6 is a cutaway side view of the inventive motor showing schematically a portion section at the mounting zone of the component of FIG. 4.
Figure 7:
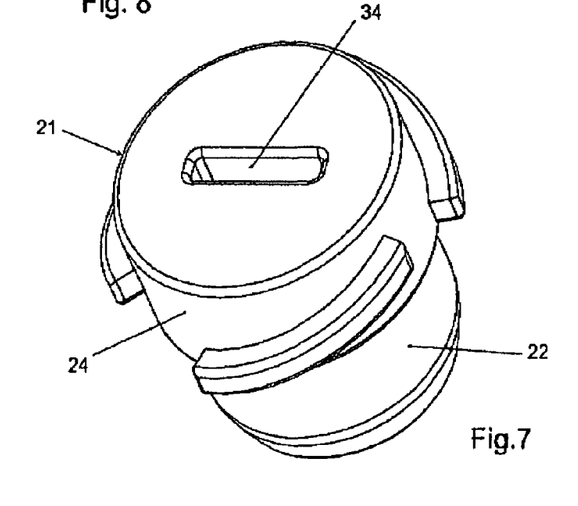
FIGS. 7, 8 and 9 are schematical, perspective, side, and longitudinal section views, respectively, of a detail of the inventive motor designed for cooperating with the component shown in FIG. 4.
Figure 8:
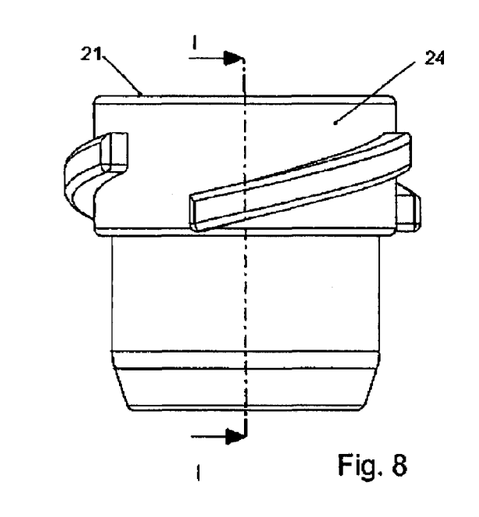
Figure 9:
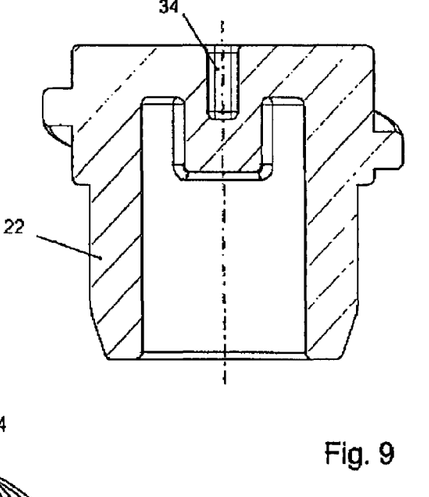
Figure 10:
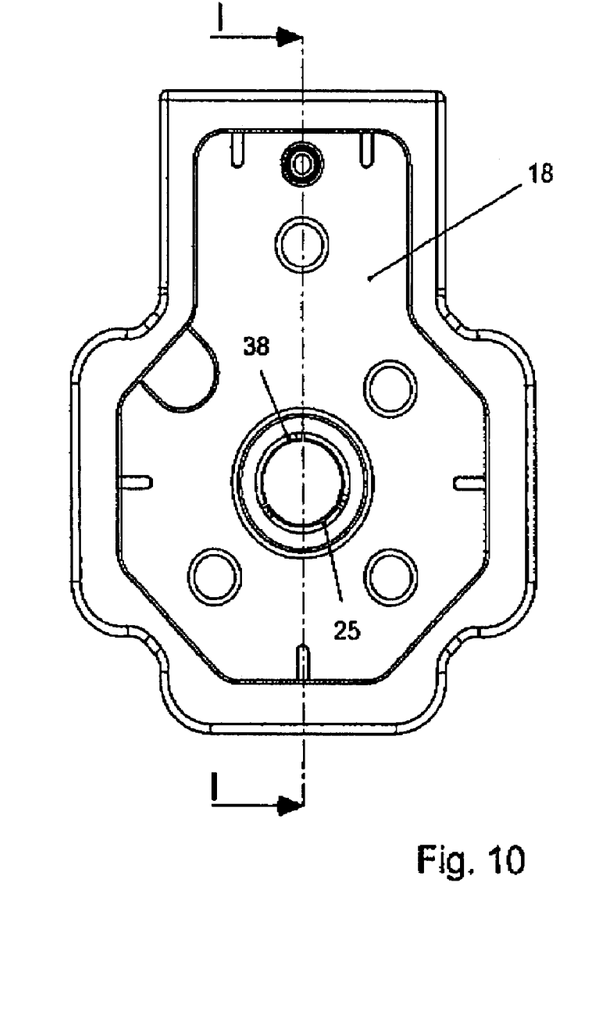
FIGS. 10 and 11 are schematical, front and cutaway side views, respectively, of a detail of the inventive motor.
Figure 11:
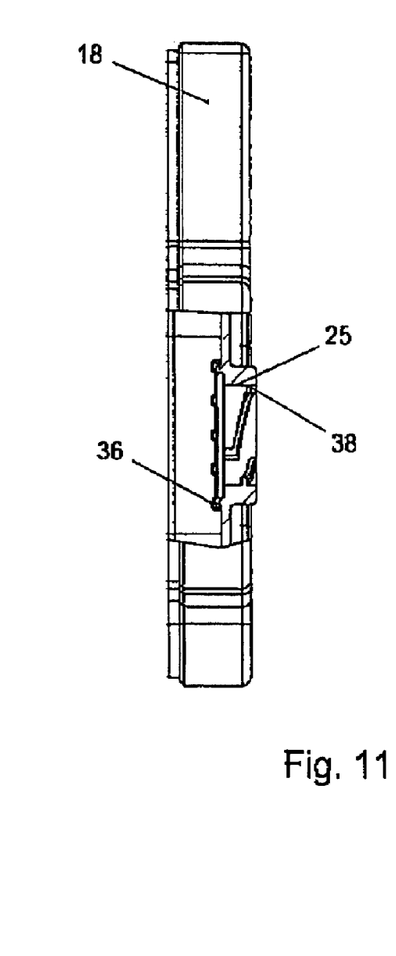
Figure 12:
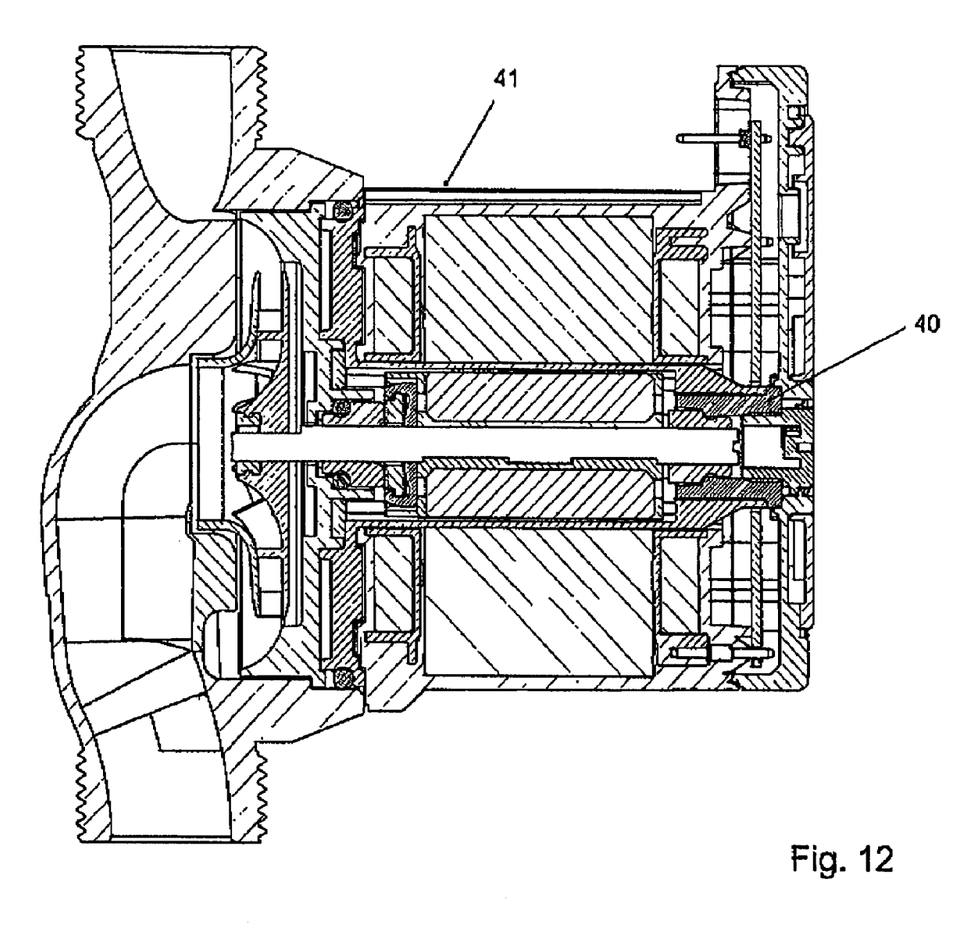
FIG. 12 is a longitudinal section view showing schematically a circulator equipped with a second embodiment of the inventive motor.
Figure 13:
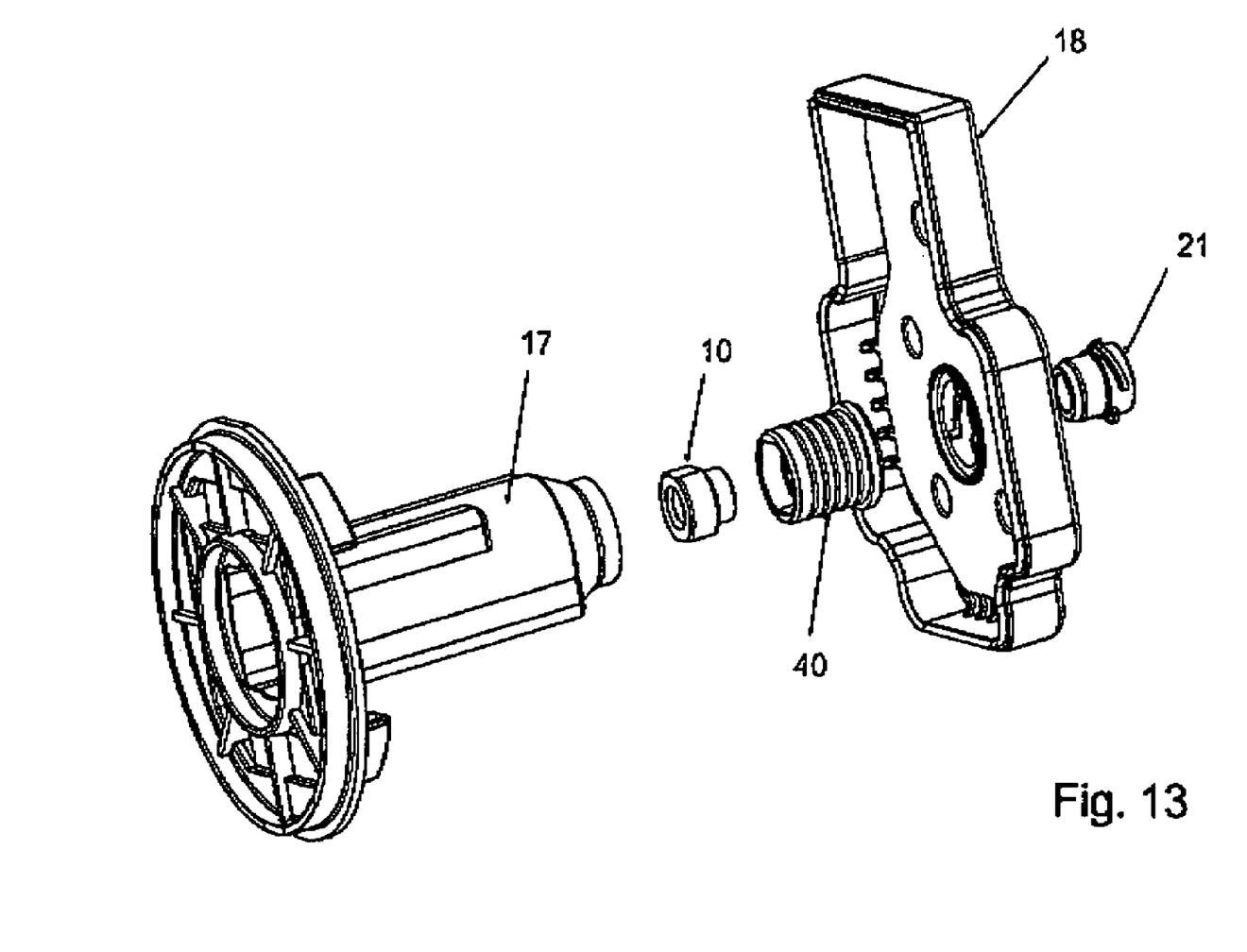
FIG. 13 is an exploded perspective view showing schematically details of the motor of FIG. 12.
Figure 14:
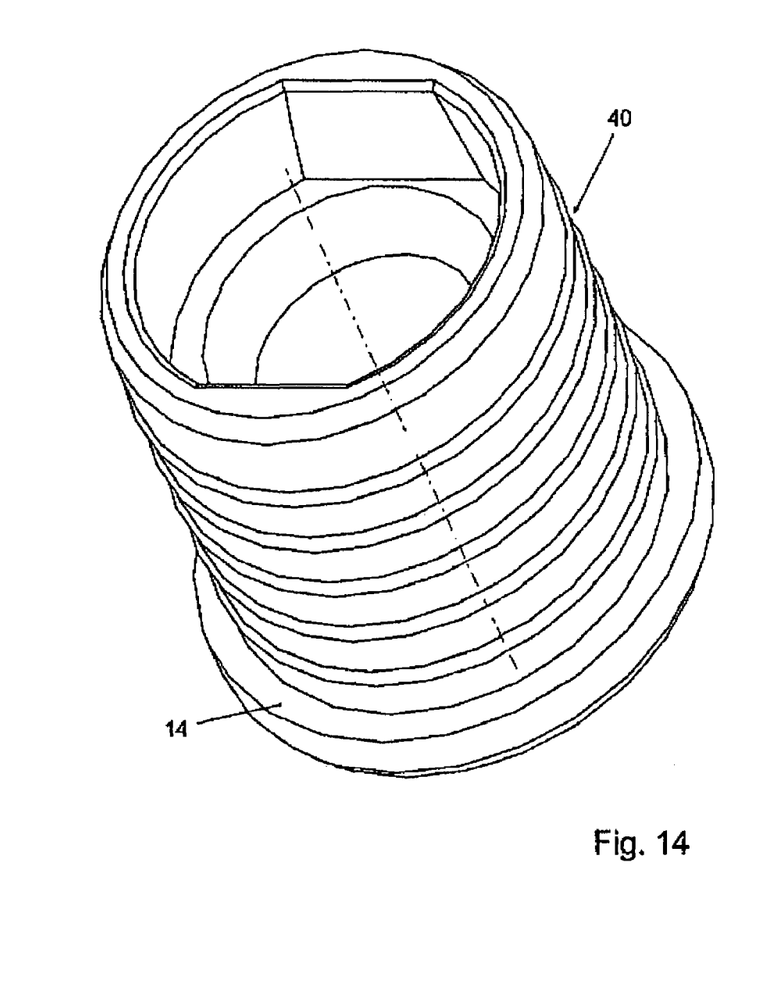
FIG. 14 is a perspective view of a specific component of the motor shown in FIG. 12.
Figure 15:
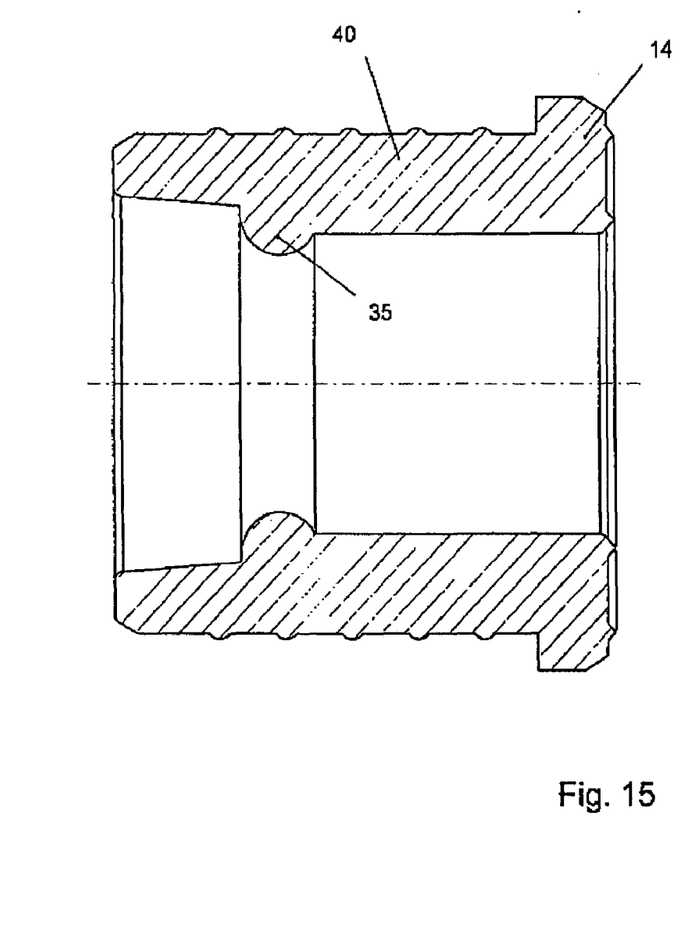
FIG. 15 is a longitudinal section view of the component shown in FIG. 14.
Figure 16:
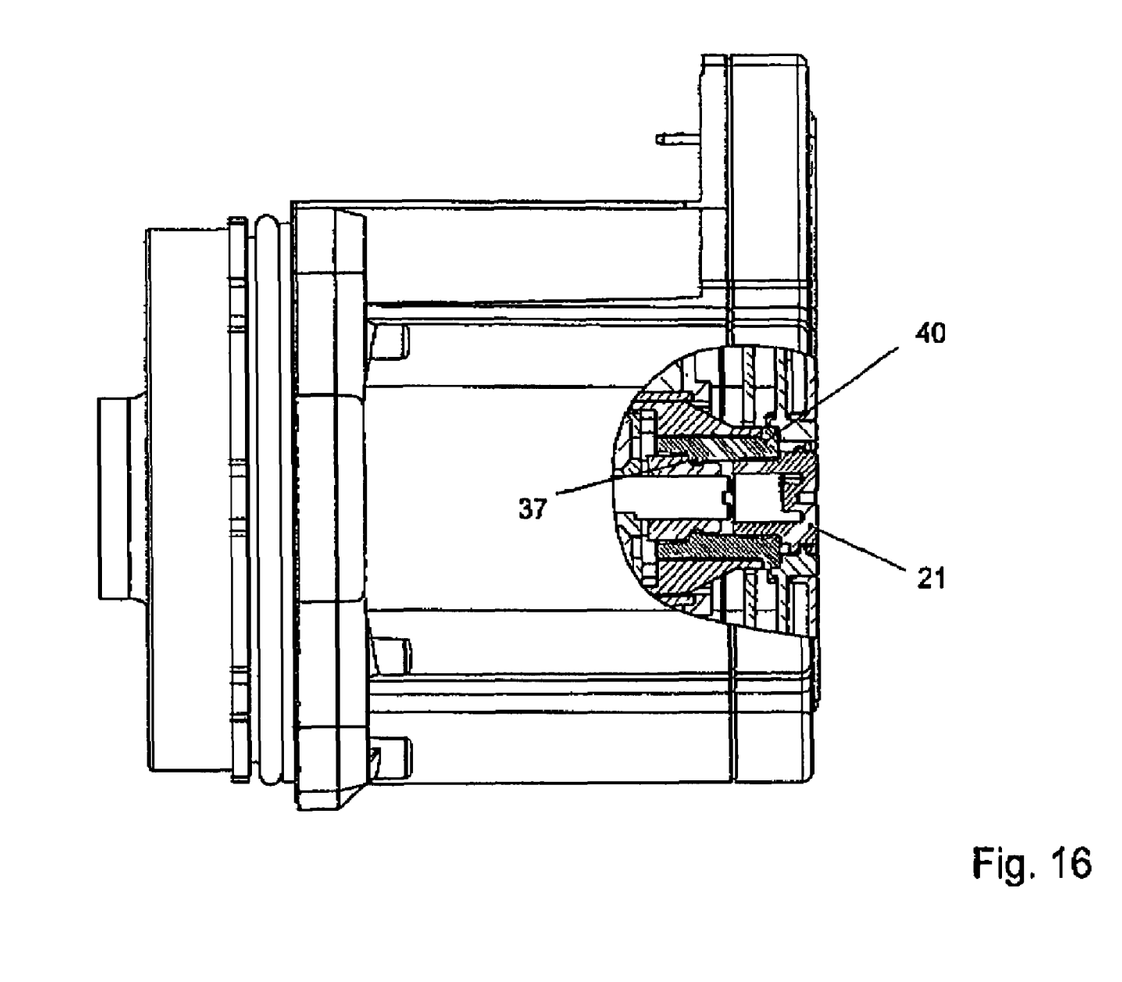
FIG. 16 is a cutaway side view of the inventive motor showing schematically a portion section at the mounting zone of the component of FIG. 14.

As it is well shown in FIG. 4, the sleeve 15 is formed with opposite inner flats 16 for key coupling with relevant outer flats 26 of the bush 10. This makes the sleeve 15 integral with the bush 10.

The motor 1 also includes a cap 21, which has a first portion 22 removably inserted into the sleeve 15, and has a second portion 24 screwly engaged in a threaded seat 25 provided of a cover 18 associated with the bottom of the casing 3. The second portion 24 is provided with a operation slot 34.

The first portion 22 of the cap 21 is forcedly inserted into the sleeve 15 to expand the sleeve 15 and to press it tightly between the cap 21 and the end 19 of the tube 17.

Similarly to the sleeve piece 15, the cap 21 is of elastomer or thermoplastic material.

Figure 17:
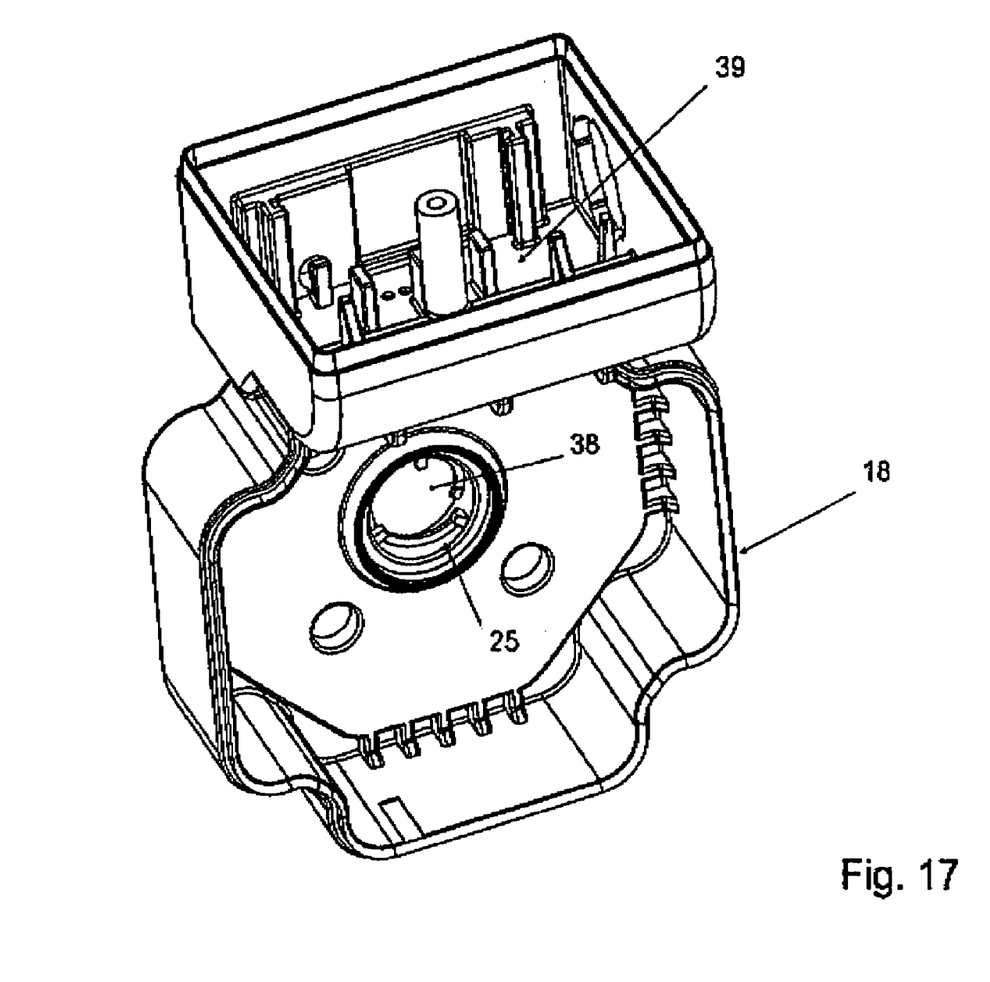
FIG. 17 is a perspective view of a modified embodiment of the detail shown in FIG. 10.

Advantageously, the cover 18 is substantially box-shaped to tightly seal under it electric driving circuits and/or components of the motor 1. Integrally associated with the cover 18 is a housing portion 39, shown in FIG. 17, enclosing additional electric components, such as a capacitor required for the motor operation. This portion 39 is essentially a part of a box for an electric connection to the plantof the pump 2.

The cover 18 may be, for example, of the kind disclosed in the Italian Patent Application No. PD2001A000277 to the same Applicant.

The cover 18 has a central opening 38 which is circular at a screwdriver slot 29 realized at the end 12 of the motor shaft 6.

The threaded seat 25 is realized inside the opening 38, said seat being co-axial with respect to the shaft 6.

The sleeve 15 has an end edge 14 tightly engaged against a corresponding annular seat 36 which is provided inside the end of the threaded seat 25. Thus, the electric and electronic parts confined between the bottom end of the casing 3 and the cover 18 are protected against water seepage.

In a second embodiment, a motor 41 is shown in FIGS. 12 to 17, where elements having the same construction and operating in the same manner as in the previously described embodiment are denoted by the same reference numerals. Inside the motor 41 a sleeve piece 40, having a slightly different construction from that of the sleeve piece 15, is used.

The ring seal 27 is formed integrally with the sleeve 40, and has a ridge 35 tightly engaged in a groove 37 provided in the bush 10. These details are to be seen more clearly in FIGS. 13, 15 and 16.

The motor of this invention does solve the technical problem and has a number of advantageous features, the first of which is that the sleeve 15 supports one of the rotor bearings and allows the rotor to align itself even under severe conditions of operation.

The elastic nature of the sleeve 15 compensates for any misalignment of the rotor that may arise in operation.

By using thermoplastic or rubber materials that are resistant to high temperatures, the motor of the invention is enabled to withstand working loads at high temperatures of the working fluid, even temperatures higher than 110° C.

The cap 21 allows the slot 29 to be inspected and used for unlocking the pump, and at the same time the hydraulic tightness of the open end 19 of the tube 17.

In essence, differently from prior art, hydraulic tightness is achieved by means of a radial seal rather than by compression of a seal. Improved tightness is thus provided even with wider tolerances brought about by an extensive use of plastic materials.

In addition, when screwing it out, the cap 21 is released gradually, as is typical of threaded connections, to vent off compressed gases that may have been formed or built up inside the tube over a time.

Lastly, it is worth noting that effective hydraulic tightness is achieved with respect to the driving electronic components of the motor, housed in the rear part of the circulator, because any water seepage from the end 12 of the motor shaft would be deflected outwards by the cap 21.

From the foregoing description it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A permanent-magnet synchronous electric motor with isolated rotor for circulation pumps of heating and/or conditioning systems, comprising:
   a motor casing,
   a stator in said motor casing with associated coils;
   a permanent-magnet rotor mounted in a housing isolated from the stator;
   a shaft integral with the rotor, the shaft being mounted inside a tube having a tapered open end; and
   at least one bearing means supporting said shaft and being fixed to said housing;
   at least one of said at least one bearing means comprising:
      a bush rotatively engaged by one end of the shaft;
      a sleeve piece keyed onto the bush and fixedly inserted by a screw-threaded connection to the tapered open end of the tube at one end of the housing; and
      a cap having a first portion removably inserted into the sleeve piece and a second portion screwly engaged in a threaded seat of the casing,
   wherein the sleeve piece is formed of an elastomeric material and has a tapered inner portion, and
   wherein the first portion of the cap is inserted into the tapered inner portion of the sleeve such that the sleeve piece is caused to expand and is pressed tightly between the cap and the tapered end of the tube.

2. An electric motor according to claim 1, comprising a ring seal mounted between the bush and the housing.

3. An electric motor according to claim 2, wherein said ring seal is integrally formed with the sleeve piece and has a ridge tightly engaged with a groove formed in the bush.

4. An electric motor according to claim 1, wherein said bush is made of graphite or thermoplastic or ceramic material.

5. An electric motor according to claim 1, wherein said sleeve piece is of elastomer or thermoplastic material.

6. An electric motor according to claim 1, wherein said cap is of elastomer or thermoplastic material.

7. An electric motor according to claim 1, wherein said first portion of the cap is forcedly inserted into the sleeve piece.

8. An electric motor according to claim 1, wherein said threaded seat is provided in a cover associated with the bottom of the casing at said end of the shaft in coaxial relationship therewith.

9. An electric motor according to claim 1, wherein said shaft end is formed with a screwdriver slot.

10. An electric motor according to claim 1, wherein the sleeve piece has an end edge tightly engaged against a corresponding annular seat provided inside the end of said threaded seat.

11. A permanent-magnet synchronous electric motor with isolated rotor for circulation pumps of hearing and/or conditioning systems, comprising:
   a motor casing;
   a stator in said motor casing and having associated coils;
   a housing isolated from the stator for hosting a permanent-magnet rotor;
   a shaft integral with the rotor, the shaft being mounted inside a tube having a tapered open end;
   bearing means supporting said shaft in said housing and comprising:
      a bush rotatively engaged by one end of the shaft;
      a sleeve inserted into the tapered open end of the tube at one end of the housing and keyed onto said bush;
      and a cap having a first portion removably inserted into said sleeve and a second portion screwly engaged in a threaded seat of the casing,
   wherein the sleeve is formed of an elastomeric material and has a tapered inner portion, and
   wherein the first portion of the cap is inserted into the tapered inner portion of the sleeve such that the sleeve is caused to expand and is pressed tightly between the cap and the tapered end of the tube.

12. An electric motor according to claim 11, comprising a ring seal mounted between said bush and the housing.

13. An electric motor according to claim 12, wherein said ring seal is integrally formed with said sleeve having a ridge tightly engaged with a groove formed in the bush.

14. An electric motor according to claim 11, wherein said bush is made of graphite or thermoplastic or ceramic material.

15. An electric motor according to claim 11, wherein said sleeve is made of elastomer or thermoplastic material.

16. An electric motor according to claim 11, wherein said cap is made of elastomer or thermoplastic material.

17. An electric motor according to claim 11, wherein said first portion of the cap is forcedly inserted into said sleeve.

18. An electric motor according to claim 11, wherein said threaded seat is provided in a cover associated at the bottom of the casing in coaxial relationship with said end of the shaft.

19. An electric motor according to claim 11, wherein said shalt end is formed with a screwdriver slot.

20. An electric motor according to claim 11, wherein said sleeve has an end edge tightly engaged against a corresponding annular seat provided inside the end of said threaded seat.

* * * * *